Inventor:
Lucien W. Mueller
Frederick Tratzik
By Cushman, Darby & Cushman
Attorneys Patented Apr. 14, 1953

2,634,946

UNITED STATES PATENT OFFICE 2,634,946

AXIALLY MOVABLE VALVE PLUG

Lucien W. Mueller and Frederick Tratzik, Decatur, Ill., assignors to Mueller Co., Decatur, Ill., a corporation of Illinois Application December 23, 1946, Serial No. 717,982

5 Claims. (Cl. 251—97)

The present invention relates to valves.

Objects of the invention are to provide valves which may be economically constructed, will provide an extremely efficient seal in a flow line under pressure, and which readily can be operated, even when used under extremely high line pressure.

Other objects and advantages of the invention will be apparent from the following specification and accompanying drawing wherein.

Figure 1:
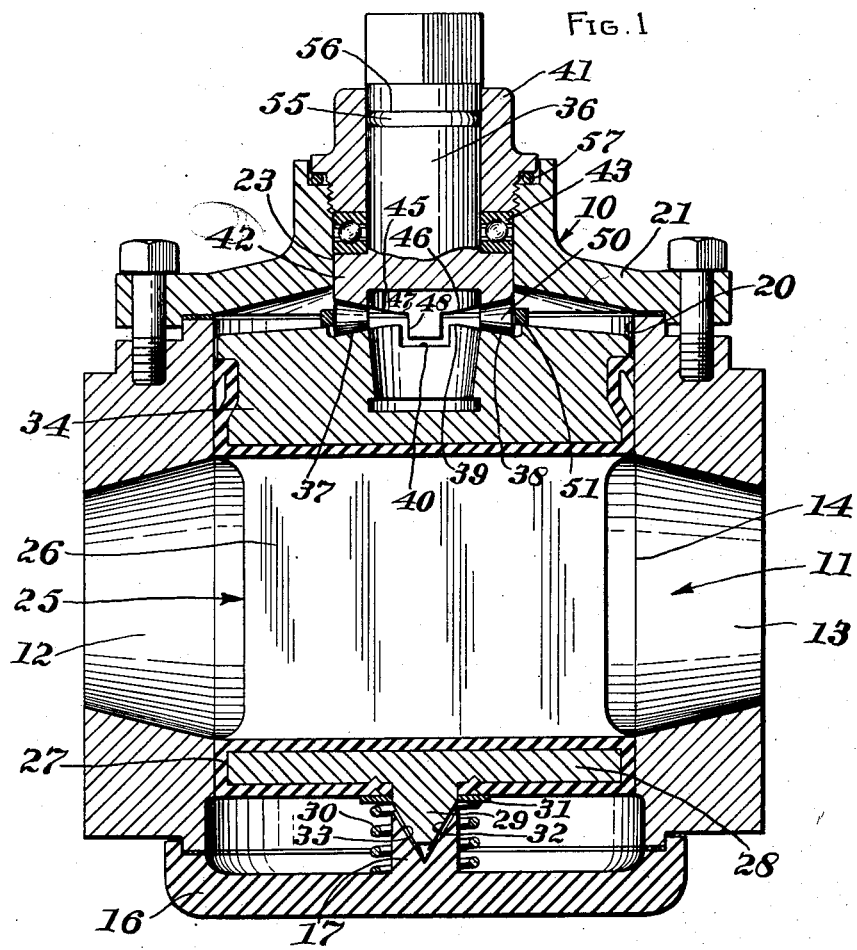
Figure 1 is an axial section through a valve of the present invention.

Referring to Figure 1, the numeral 10 designates the valve casing which is provided with a flow passageway 11 including an inlet 12 and an outlet 13. A cylindrical valve seat bore 14 extends transversely of the flow passageway 11. One end of the bore 14 is closed by a plate or cap 16 which may be held in place by bolts or the like. The cap 16 is provided with a centrally positioned socketed stud 17 for a purpose hereinafter described.

The opposite end 20 of the seat bore 14 is closed by a bossed plate 21 secured to the casing by bolts, as shown. Plate 21 includes a bore 23 of substantially smaller diameter than the seat bore 14.

A plug 25 is mounted in the seat bore 14, the plug including a flow port 26. The plug is illustrated with a layer 27 of a resilient material, such as rubber, applied to its seating surface and also to the flow port 26.

The end 28 of the plug which is adjacent the cap plate 16 is provided with an integral tapered projection or pin 29 adapted to engage the socket of stud 17. A coil spring 30 which surrounds the stud 17 has one end bearing upon the inner surface of the plate 16 and its opposite end bearing upon a washer 31 which surrounds projection 29. The spring 30 is sufficiently strong that it will normally hold the plug 25 in such position that the conical surface 32 of the projection 29 will be out of contact with the opposed conical surface of the socket 33 in stud 17. This will cause operating connections provided at the opposite end 34 of the plug 25 to be held in close engagement with an operating arrangement described immediately below.

The end 34 of plug 25 adjacent the bossed plate 21 is provided with an operating connection which cooperates with a similar structure formed on the inner end of an operating stem 36 rotatable in the plate 21. The operating connection on the plug includes a pair of diametrically opposed and circumferentially extending concave cam surfaces 37 and 38, each of which is of V-shaped form. The cam surfaces 37 and 38 each extend through an arc of somewhat less than 60°, as illustrated in Figure 1, and the ends of these surfaces join a flat surface 39. It will thereby be understood that two diametrically opposite flat surfaces 39 are provided, one of which is illustrated in Figure 1. As is typified by the flat surface 39 appearing in Figure 1, each of the two flat surfaces 39 includes a recess 40 intermediate its length. As is the case in the corresponding structure illustrated in the application for Valves of Walter J. Bowan and Frederick Tratzik, Serial No. 611,465, filed August 20, 1945, Patent No. 2,510,494, issued June 6, 1950, the cam surfaces 37 and 38, the flat surfaces 39 and the diametrically opposed recesses 40, are all arranged about a circle concentric with the longitudinal axis of the plug, with the deepest points on the cams 37 and 38 positioned on a line which is at right angles to the center line of the recesses 40 and parallel with the axis of the plug flow port 26.

The operating stem 36 is rotatable in a collar 41 threaded in the bossed plate 21 and includes an inner enlarged end portion 42. A bearing assembly 43 is positioned between the inner end of the collar 41 and the outer surface of the enlarged portion 42 of stem 36. The inner end of the enlarged stem portion 42 is provided with V-shaped concave cam surfaces 45 and 46 arranged diametrically opposite each other with a flat surface 47 between them and a projection 48 is provided intermediate the ends of each flat surface 47.

A roller 50 is positioned between the opposed cam surfaces 37 and 45 and a second roller 50 is positioned between the opposed cam surfaces 38 and 46. These rollers are tapered to conform to the surfaces of the cams and are rounded at their outer ends so that they will have a single point bearing upon the inner cylindrical surface of a holding ring 51 which fits about the inner end of the stem 36.

The side surfaces of the recesses 40 on the plug and the projections 48 on the operating stem extend along lines which are radial with respect to the longitudinal axis of the plug.

In operation, the plug 25 will be held in such position by the spring 29 that the plug cam surfaces 37 and 38 will be held in firm contact with the rollers 50 and the latter will be in firm engagement with the cam surfaces 45 and 46 of the operating element or stem 36. In order to rotate the plug from the open position shown in Figure 1 to a closed position, the operator will apply a tool to the stem 36 to rotate the latter. Because line pressure will not exert any considerable resistance during at least the initial portion of closing movement of the plug, the initial rotation of stem 36 will readily cause the cam surfaces 45 and 46 of the stem to move the rollers 50 along the opposed cam surfaces 37 and 38 of the plug, thereby rotating the rollers out of the deepest portions or apices of the opposed V-shaped cams so that the plug will be slightly moved in an axial direction against the force exerted by the spring 30. Then the leading radial surface of each projection 48 will contact with the opposed radial surface of the corresponding recess 40 so that the plug will be positively rotated by the engagement of these radial surfaces.

When the plug has reached closed position, the operator may rotate the operating stem 36 very slightly in the reverse direction so that the deepest portions of the cam surfaces 45 and 46 will be in engagement with the rollers 50 and the projections 48 will be positioned intermediate the recesses 40, viz., the relationship illustrated in Figure 1. It will be understood that during the above rotation of the plug from open to closed position the axial movement of the plug will cause the central projection 29 to move slightly further into the socket 17. However, because the line pressure will not substantially retard the rotation of the plug from open to closed position, the seating surface 14 of the valve casing will primarily serve as the journal on which the plug rotates.

Rotation of the plug may be limited to 90° by stop means provided on the plug and casing and not illustrated in the drawing.

It has been pointed out above that only relatively slight resistance to rotation results from movement of the plug from open to closed position. However, there is a substantially greater resistance to movement of a resiliently covered plug from closed position to open position, particularly during the initial portion of this rotation. This resistance primarily results from the fact that when a resiliently covered plug is in closed position, especially in a high pressure line, the pressure of the fluid acting at the inlet side of the plug 12, and against a nonported surface of the plug, will cause the plug to be canted toward the outlet port 13. In the valve disclosed, the rollers 50 will act as a pivoting surface for such canting, because in closed position of the plug these rollers will extend along a line transverse to the flow ports 12 and 13. As a result, the longitudinal axis of the plug will be tilted with respect to the longitudinal axis of the valve casing seat bore 14 so that the plug projection 29 will be closest to the portion of the surface of socket 33 which is nearest the outlet port 13. Furthermore, the portion of the resilient covering 27 of the plug which is within the outlet port 13 will be pressed into the mouth of that outlet. In effect, this portion of the resilient covering will form a slight hump or projection within the outlet 13. The presence of this hump, as well as the fact that the plug is tilted and strongly urged toward the outlet 13 by the line pressure, makes closing movement relatively difficult and may also cause the resilient covering to be scratched or marred during opening movement.

The above resistance to rotation from closed position and the marring of the resilient covering are obviated by the present invention. In more detail, when the operating stem 36 is initially rotated to move the plug from closed position, one incline of each stem cam surface 45 and 46 will move over the rollers 50 and also cause the rollers to roll out of the apices of the plug cam surfaces 37 and 38. This action will occur because, during this initial rotation of the stem 36, the plug will resist rotation due to the canting action being exerted upon it by the line pressure. However, the fact that the rollers 51 are moved out of the apices of the stem and plug cam surfaces will result in the plug being bodily moved toward the cap plate 16. Because the projection or pin 29 is already closest to the portion of socket 33 closest to the outlet port 13, this generally axial movement of the plug will cause these opposed portions of the projection 29 and socket 33 to actually come into contact. Therefore, further axial movement of the plug will simply cause the projection 29 to move deeper into the socket 33 so that the axis of the plug will now be brought into coincidence with the axis of the casing seat 14.

In other words, the axial movement of the plug resulting from the cooperation of the operating elements will cause the conical socket 33 and conical plug projection 29 to guide or move the plug to a position wherein the plug axis is coincident with the seat bore axis, thereby withdrawing from outlet 13 all of the resilient covering 27 which has heretofore been bulged into that mouth.

The spacing between the radial walls of the operating stem projections 48 and the plug recesses 40 is such that when the plug has been properly centered, these surfaces will then come into contact and positively rotate the plug from closed to open position. Then the stem 36 may be slightly rotated in the reverse direction to again bring the rollers and the deepest portions of the cam surfaces into alignment, the spring 29 then maintaining this position.

In order to prevent leakage between the operating stem 36 and the collar 41, a sealing element 55 of the type known as an O-ring is positioned in a circumferential groove 56 formed in the stem 36. O-rings are annular, endless and formed of resilient material. They have the characteristic that when exposed to pressure at any point of their radial cross section, they tend to fill up the space in which they are fitted, provided that the space is of a different radial section from the O-ring.

For example, the O-ring 55 is normally round in radial section, and the walls of the groove 56 define a space which is rectangular in radial section. Assuming now that pressure flows outwardly between the stem 36 and the bore 23 of collar 41, this pressure will act upon the portion of the O-ring 55 which is illustrated as lowermost in Figure 1, causing that surface to flatten. Flattening of the O-ring will cause it to expand along a line normal to the direction of pressure. Therefore, the ring will closely engage the inner surface of the bore 23 and the inner surface of the groove 56 to form a tight seal between these surfaces.

A second O-ring 57 may be positioned between the collar 41 and the bossed plate 21. It is desirable that the collar 41 only be threaded into the plate 21 to such an extent that a space will normally be provided between the valve centering projection 29 and the surface of the centering socket 33 in stud 17 on the valve casing. That is, the plug 25 must be free for enough axial movement to accommodate the axial motion which will be applied thereto by the rotation of the operating stem. It may be that when the collar 41 is threaded inwardly to only a sufficient distance to provide for this axial movement of the plug, O-ring 57 will not be tightly compressed in a vertical direction as viewed in Figure 1. However, because of the characteristics of an O-ring set forth above in connection with the O-ring 55, any leakage along the threads of the collar 41 will simply cause the O-ring 57 to expand in a direction normal to the line of pressure flow so that a seal will be maintained between the plate 21 and collar 41.

Figure 2:
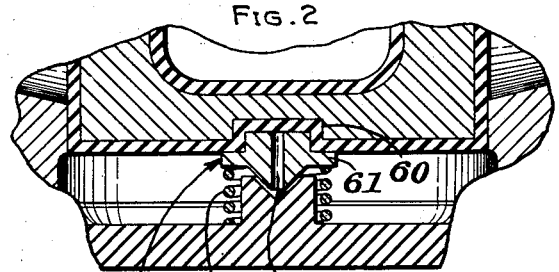
Figure 2 is a fragmentary view, also in axial section, showing a modification of the Figure 1 device.

Figure 2 shows a modified form of plug centering structure which is identical with that of Figure 1 except that the element 29a, corresponding to the pin or projection 29 of Figure 1, is formed separately from the plug. In more detail, element 29a fits within a resiliently covered recess 60 in the plug and spring 30 bears upon a flange 61 provided on the element 29a. By this construction, the plug may be coated with resilient material in the usual manner and without having to take any special action to prevent covering the projection, as would be the case with the Figure 1 structure. The element 29a is also shown provided with a central axial passage 62 for entrapped air.

The operation of the Figure 2 form of projection and socket is identical with that of Figure 1.

It will be understood that the conical projections 29 and 29a of Figures 1 and 2, respectively, are concentric with the axes of the respective plugs, while the cooperating conical recesses are concentric with the axes of the respective casing seat bores.

The terminology used in the specification is for the purpose of description and not of limitation, the scope of the invention being defined in the claims.

We claim:

1. In a valve, a casing including a seat bore and a flow passage extending transversely of the seat bore, a ported plug rotatable in and capable of a slight radial movement relative to the seat bore, an operating stem at one end of the plug and projecting out of the casing, coacting driving connection means carried at the opposed ends of the plug and operating stem, said means being so operatively connected that the plug carried means and plug may pivot with respect to the stem carried means about a line radial of the seat bore, and coacting means at the opposite end of the plug and seat bore operable upon actuation of said operating means to guide the plug from a canted position with respect to the seat bore and to such position that the plug axis will be positioned substantially in coincidence with the axis of the seat bore.

2. A valve of the character described in claim 1 wherein a seating surface is covered with resilient material.

3. A valve of the character described in claim 1 wherein the means to guide the plug from a canted position with respect to the seat bore comprises conical pin means and conical socket means, with one of said means carried by the plug and the other of said means carried by the casing.

4. A valve of the character described in claim 3 wherein the seating surface is covered with resilient material.

5. In a valve, a casing provided with a flow passageway and a seat bore extending transversely of the passageway, a plug including a flowport rotatably mounted in the seat bore, said plug being capable of a slight radial movement relative to the seat bore, a member rotatable in the casing at one end of the plug to engage and rotate the plug and move it axially of the seat bore, and cooperating means at the opposite end of the plug and casing to guide the plug to a position to bring the plug axis into substantial coincidence with the seat bore axis upon actuation of said operating means, said cooperating means comprising a conical pin element and conical socket element, with one of said elements carried by the plug and the other of said elements carried by the casing.

LUCIEN W. MUELLER.
FREDERICK TRATZIK.

References Cited in the file of this patent

UNITED STATES PATENTS

| Number | Name | Date |
|---|---|---|
| 574,571 | Pollock | Jan. 5, 1897 |
| 2,139,632 | Flodin | Dec. 6, 1938 |
| 2,222,626 | Mueller | Nov. 26, 1940 |
| 2,251,481 | Corbin | Aug. 5, 1941 |
| 2,285,222 | Mueller | June 2, 1942 |